United States Patent
Pandi

(10) Patent No.: US 9,985,485 B2
(45) Date of Patent: May 29, 2018

(54) MAGNET INSERT DESIGN FOR ROTOR LAMINATION

(71) Applicant: GM Global Technology Operations LLC, Detroit, MI (US)

(72) Inventor: Murali Pandi, Madurai (IN)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 14/242,023

(22) Filed: Apr. 1, 2014

(65) Prior Publication Data

US 2015/0280499 A1 Oct. 1, 2015

(51) Int. Cl.
*H02K 21/12* (2006.01)
*H02K 1/27* (2006.01)

(52) U.S. Cl.
CPC ........... *H02K 1/276* (2013.01); *H02K 1/2766* (2013.01)

(58) Field of Classification Search
CPC ..................................... H02K 1/276
USPC ..................................... 310/156.53
See application file for complete search history.

(56) References Cited

U.S. PATENT DOCUMENTS

| | | | | |
|---|---|---|---|---|
| 6,353,275 B1* | 3/2002 | Nishiyama | ........... | H02K 1/2706 310/156.21 |
| 8,138,650 B2* | 3/2012 | Shiga | .................. | H02K 1/2786 29/596 |
| 9,003,639 B2* | 4/2015 | Haruno | ................. | H02K 1/2766 29/598 |
| 2004/0032183 A1 | 2/2004 | Nakamura et al. | | |
| 2006/0103253 A1* | 5/2006 | Shiga | ..................... | H02K 15/03 310/156.45 |
| 2007/0205686 A1* | 9/2007 | Ishida | .................... | H02K 1/276 310/156.21 |
| 2008/0278021 A1* | 11/2008 | Ley | ....................... | H02K 1/2766 310/156.38 |
| 2013/0249345 A1 | 9/2013 | Kaiser et al. | | |
| 2013/0313934 A1* | 11/2013 | Kawasaki | ............ | H02K 1/2706 310/156.11 |
| 2014/0167552 A1* | 6/2014 | Herranz Gracia | ..... | H02K 1/276 310/156.53 |
| 2015/0001981 A1* | 1/2015 | Hattori | ................... | H02K 1/276 310/156.53 |

FOREIGN PATENT DOCUMENTS

| | | |
|---|---|---|
| CN | 102738937 A | 10/2012 |
| DE | 102007029719 A1 | 8/2008 |

OTHER PUBLICATIONS

Chinese Office Action dated Mar. 27, 2017 ; Application No. 201510150643.9; Applicant: GM Global Technology Operations LLC.; 9 pages.
Chinese Office Action dated Feb. 5, 2018 ; Application No. 201510150643.9; Applicant: GM Global Technology Operations LLC.; 13 pages.

* cited by examiner

*Primary Examiner* — Hanh Nguyen
(74) *Attorney, Agent, or Firm* — BrooksGroup

(57) ABSTRACT

A number of variations may include a product comprising a magnet holder for a rotor lamination comprising: a first portion, a second portion, and a third portion, wherein the first and second portions are linear and constructed and arranged to hold a magnet and wherein the third portion extends outward from approximately a center location between the first and the second portions, and wherein the third portion is constructed and arranged to carry a load from a centrifugal force of the magnet.

18 Claims, 3 Drawing Sheets

MAGNET INSERT DESIGN FOR ROTOR LAMINATION

TECHNICAL FIELD

The field to which the disclosure generally relates to includes traction motors.

BACKGROUND

A traction motor may include a rotor lamination.

SUMMARY OF ILLUSTRATIVE VARIATIONS

One variation may include a product comprising a magnet holder for a rotor lamination comprising: a first portion, a second portion, and a third portion, wherein the first and second portions are linear and constructed and arranged to hold a magnet and wherein the third portion extends outward from approximately a center location between the first and the second portions, and wherein the third portion is constructed and arranged to carry a load from a centrifugal force of the magnet.

Another variation may include a product comprising a rotor lamination comprising: an annular portion which includes an annular opening in its center, wherein a plurality of first, second, third, and fourth cutouts extend around the periphery of the annular portion; a first set of magnets, wherein the first set of magnets are inserted into the plurality of first and second cutouts; a first set of magnet holders and a second set of magnet holders, wherein the first set of magnet holders are inserted into the plurality of third cutouts and wherein the second set of magnet holders are inserted into the plurality of fourth cutouts; and a second set of magnets, wherein the second set of magnets are inserted into the first and second set of magnet holders.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
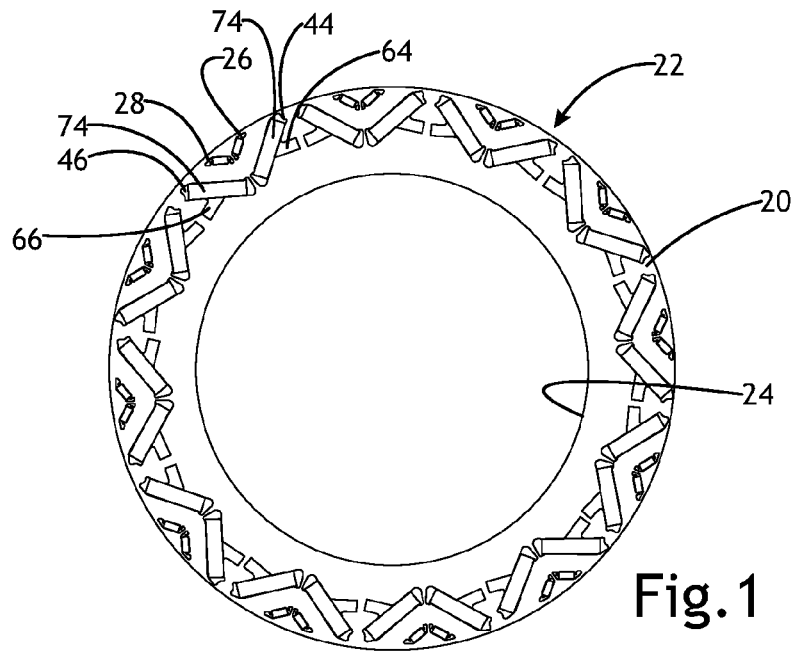
FIG. 1 illustrates a front view of a rotor core according to a number of variations.
Figure 2:
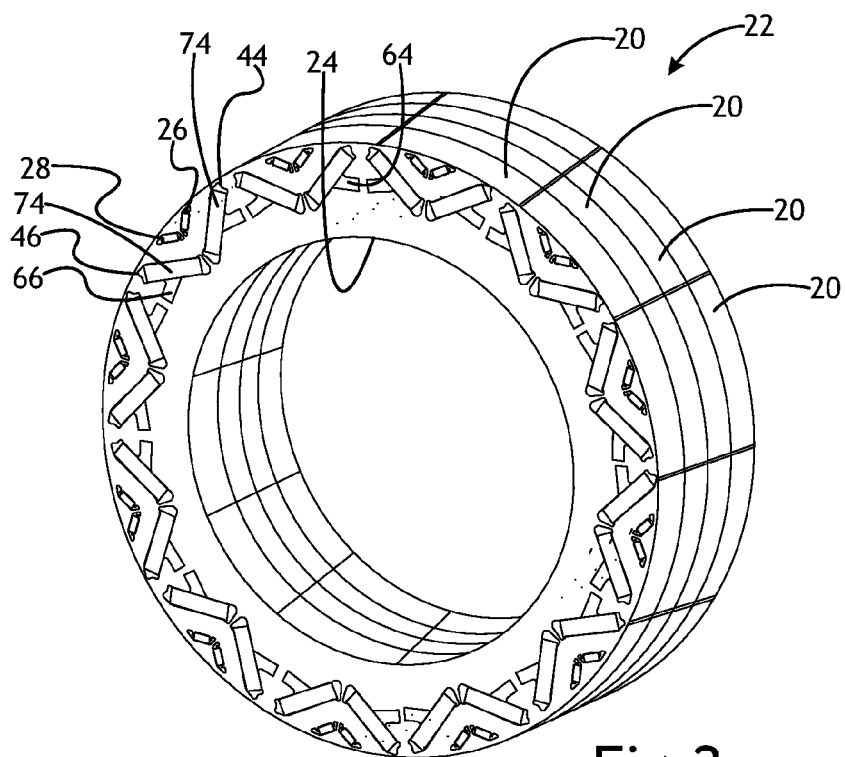
FIG. 2 illustrates a perspective view of a rotor core according to a number of variations.

Referring to FIGS. 1-2, in a number of variations, a product may include a rotor lamination magnet holder 64, 66. A magnet holder 64, 66 may be constructed and arranged to house a rotor lamination magnet 74 as well as to reduce the load of the magnet 74 on weak areas of a rotor lamination 20 which may be caused from the centrifugal load of the magnet 74 which may occur as the rotor lamination 20 rotates in a motor assembly, as will be discussed hereafter.

In a number of variations, one or more rotor laminations 20 may be used to form a rotor core 22 for any number of motor assemblies including, but not limited to, traction motors. The rotor core 22 may be constructed and arranged to rotate around a stator. The relative motion between the rotor core 22 and the stator may produce mechanical or electrical energy. A traction motor may be used in any number of vehicles including, but not limited to, hybrid electric vehicles and/or battery electric vehicles.

In a number of variations, a rotor lamination 20 may be annular in shape and may include an annular opening 24 in its center. The rotor lamination 20 may comprise a single unit or may be comprised of several segments interlocked together. The rotor lamination 20 may include a plurality of cutouts 26, 28, 44, 46 which may be located around the periphery of the rotor lamination 20. The cutouts 26, 28, 44, 46, may form a pattern around the rotor lamination 20 or may be dispersed randomly throughout the rotor lamination 20 depending on the motor requirements. In one variation, the rotor lamination 20 may comprises a pattern of a first 26, a second 28, a third 44, and a fourth cutout 46 which may repeat around the periphery of the rotor lamination 20. The rotor lamination 20 may comprise any number of materials including, but not limited to, electrical steel. A rotor lamination 20 may be formed in any of a number of ways including, but not limited to, stamping and/or laser cutting.

Figure 3:
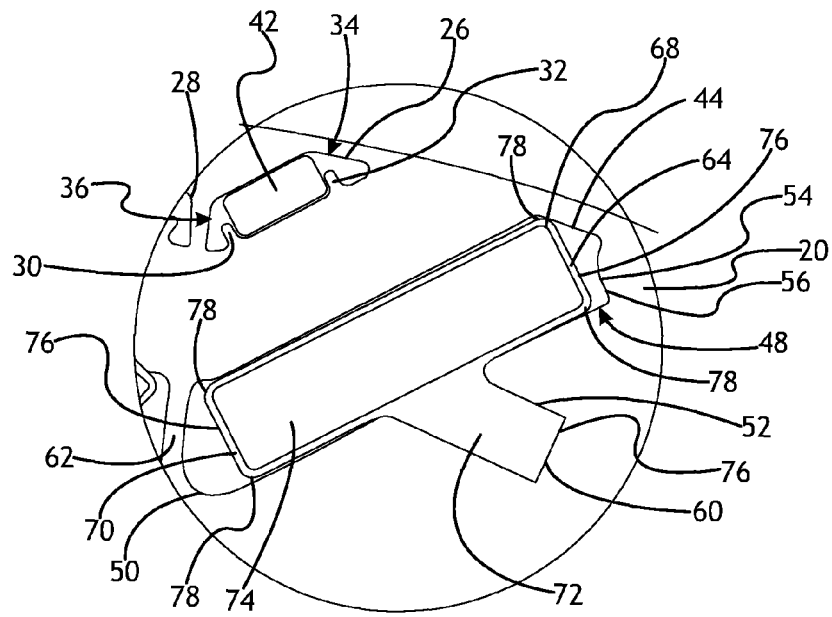
FIG. 3 illustrates a close-up view of a rotor lamination according to a number of variations.
Figure 4:
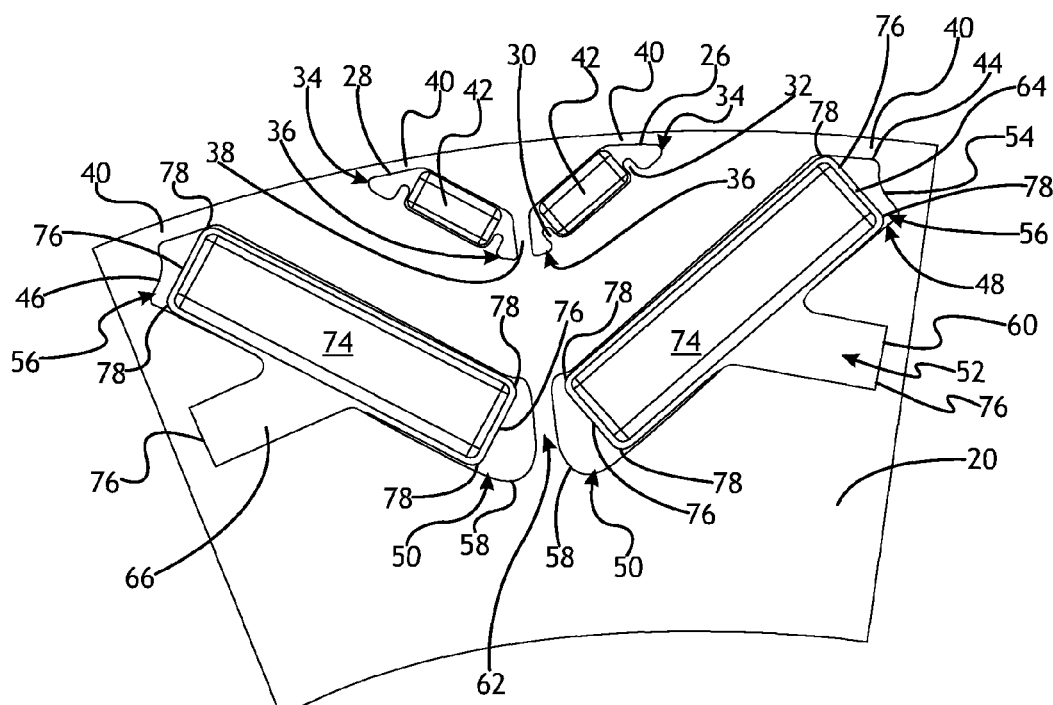
FIG. 4 illustrates a close-up view of a rotor lamination according to a number of variations.
Figure 5:
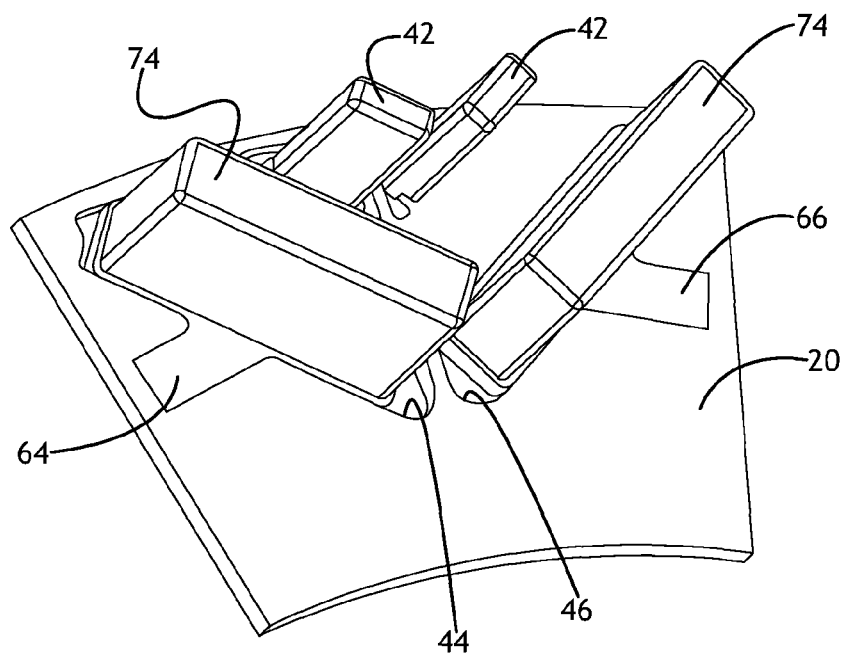
FIG. 5 illustrates a rear view of a rotor lamination according to a number of variations.
Figure 6:
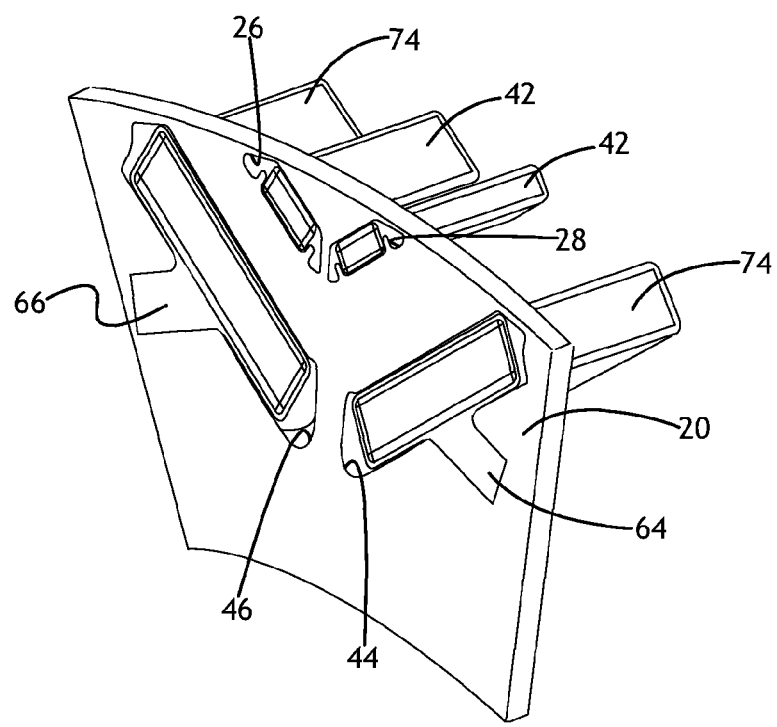
FIG. 6 illustrates a perspective view of a rotor lamination according to a number of variations.

Referring to FIGS. 3 and 4, in a number of variations, the first and second cutouts 26, 28 may each be constructed and arranged to house a first set of magnets 42 as will be discussed hereafter. The first cutouts 26, 28 may be any number of shapes including, but not limited to rectangular, circular, triagonal, square, etc. In one variation, the first cutout 26 may be substantially trapezoidal and may receive a first tab 30 and a second tab 32 which may extend into the first cutout portion 26 from the rotor lamination 20. The first cutout 26 may include a first end 34 and a second end 36, for example as illustrated in FIG. 3. The first end 34 may extend away from the second end 36 at angle. The second cutout 28 may be the mirror image of the first cutout 26 and may form an acute angle with the first cutout 26, for example as illustrated in FIG. 4. The second ends 36 of the first and second cutouts 26, 28 may be separated by a first web 38 in the rotor lamination 20, for example as illustrated in FIG. 4. The first ends 34 of the first and second cutouts 26, 28 may extend to a bridge 40 which may extend around the perimeter of the rotor lamination 20.

In a number of variations, a first set of magnets 42 may extend through each of the first and second cutouts 26, 28 which may extend around the periphery of one or more rotor laminations 20. The first set of magnets 42 may be press fit into the first and second cutouts 26, 28, or may be held in place by an epoxy. The first set of magnets 42 may comprise any number of magnets including, but not limited to, neodymium magnets.

In a number of variations, the third and fourth cutouts 44, 46 may each be constructed and arranged to house a set of magnet holders 64, 66 as will be discussed hereafter. The third and fourth cutouts 44, 46 may be larger than the first and second cutouts 26, 28. The third cutout 44 may be any number of shapes including, but not limited, to rectangular, circular, triagonal, square, etc. In one variation, the third cutout 44 may include a first portion 48, a second portion 50, and a third portion 52. The first and second portions 48, 50 may be linear. The first portion 48 of the third cutout 44 may extend from the second portion 50 of the third cutout 44 at an angle upward. The third portion 52 may extend outward from the first and second portions 48, 50 so that it forms an acute angle with the first portion 48 and an obtuse angle with the second portion 50. The first portion 48 may comprise an indentation 54 at its end 56. The second portion 50 may comprise a rounded end 58. The third portion 52 may include a flat end 60. The ends 56, 58, 60 may each be constructed and arranged to hold the magnet holders 64, 66 and to assist in dispersing load which may occur from the body force of the second magnets 74 due to the rotation of the rotor laminations 20 around the stator, as will be discussed hereafter. The fourth cutout 46 may be the mirror image of the third cutout 44 and may form an acute angle with the third cutout 44, for example as illustrated in FIG. 4. The ends 58 of the second portions 50 of the third and fourth cutouts 44, 46 may be separated by a second web 62. The ends 56 of the first portions 48 of the third and fourth cutout 44, 46 may each extend to the bridge 40 of the rotor lamination 20. The third cutout 44 may be parallel to the first cutout 26 and the fourth cutout 46 may be parallel to the second cutout 28.

In a number of variations, a first magnet holder 64 may be inserted into the third cutout 44 and a second magnet holder 66 may be inserted in the fourth cutout 46. The first and second magnet holders 64, 66 may each be held in place in any number of variations including, but not limited to, a transition fit. The magnet holders 64, 66 may each be constructed and arranged to reduce the body force of the second magnets 74 which may be transferred to the rotor lamination 20 due to the centrifugal force which may result from the rotation of the rotor core 22 around the stator as will be discussed hereafter.

Referring to FIG. 3, in a number of variations, the first magnet holder 64 may be any number of shapes to fit inside the third cutout 44 including, but not limited to, rectangular, circular, triagonal, square, etc. In one variation, the first magnet holder 64 may include a first portion 68, a second portion 70, and a third portion 72. The first and second portions 68, 70 may be linear and may be constructed and arranged to house a second magnet 74, as will be discussed hereafter. The first portion 68 may extend away from the second portion 70 at an angle upward. The third portion 72 may extend outward from approximately the center of the first and second portions 68, 70 and may form an acute angle with the first portion 68 and an obtuse angle with the second portion 70. The third portion 72 of the first magnet holder 64 may be constructed and arranged so that it carries a load from the second magnet 74 as the rotor core 22 rotates around the stator. In one variation, the third portion 72 may be perpendicular to the direction of the centrifugal force of the second magnet 74. This may allow the force of the second magnet 74 to be resisted at the thicker first magnet holder 64 section rather than at weaker sections of the rotor lamination 20 such as the bridge 40 and/or the second web 62. This may reduce stress at the bridge 40 and/or the second web 62 which may extend the life of the rotor lamination 20, the rotor, and/or the traction motor. This may also allow the design of the rotor lamination 20 to include thinner sections at the second web 62 and the bridge 40 which may enhance electromagnetic performance. The second magnet holder 66 may be the mirror image of the first magnet holder 64, for example as illustrated in FIG. 4. The first and second magnet holders 64, 66 may comprise any number of materials including, but not limited to, electrical steel and/or high temperature plastic. The first and second magnet holders 64, 66 may be formed in any of a number of ways including, but not limited to, stamping and/or laser cutting.

Referring to FIGS. 3-6, in a number of variations, a second set of magnets 74 may be inserted into the first and second magnet holders 64, 66. The second set of magnets 74 may comprise any number of magnets including, but not limited to, neodymium magnets. The second set of magnets 74 may be inserted into the first and second magnet holders 64, 66 in any number of variations including, but not limited to, transition fit. This may allow for assembly of the second set of magnets 74 into the first and second magnet holders 64, 66 without the use of epoxy which may reduce and/or eliminate issues in the part due to a coefficient of thermal expansion (CTE) mismatch or issues due to epoxy shrinkage. The use of the first and second magnet holders 64, 66 to hold the magnets 74 in place may also allow for easy assembly and disassembly of the rotor lamination 20. Therefore, if a magnet 74 is de-magnetized or not functioning properly, an individual magnet holder 64, 66 and/or magnet 74 may be easily replaced rather than requiring replacement of the entire rotor lamination 20, which may extend the life of a rotor and/or a traction motor.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a magnet holder for a rotor lamination comprising: a first portion, a second portion, and a third portion, wherein the first and second portions are linear and constructed and arranged to hold a magnet and wherein the third portion extends outward from approximately a center location between the first and the second portions, and wherein the third portion is constructed and arranged to carry a load from a centrifugal force of the magnet.

Variation 2 may include a product as set forth in Variation 1 wherein the third portion forms an acute angle with the first portion and an obtuse angle with the second portion.

Variation 3 may include a product as set forth in any of Variations 1-2 wherein the magnet holder comprises steel.

Variation 4 may include a product as set forth in any of Variations 1-2 wherein the magnet holder comprises a polymeric material.

Variation 5 may include a product as set forth in any of Variations 1-4 further comprising a rotor lamination comprising a plurality of cutouts and wherein the magnet holder is inserted into at least one of the cutouts.

Variation 6 may include a product as set forth in Variation 5 wherein the plurality of cutouts includes a first set of cutouts, a second set of cutouts, a third set of cutouts, and a fourth set of cutouts, and wherein a first set of magnets are inserted into the first set of cutouts and a second set of magnets are inserted into the second set of cutouts, and wherein a first set of magnet holders are inserted into the third set of cutouts, and a second set of magnet holders are inserted into the fourth set of cutouts.

Variation 7 may include a product as set forth in any of Variations 5-6 wherein the first set of cutouts and the second set of cutouts are the mirror image of each other and wherein the third set of cutouts and the fourth set of cutouts are the mirror image of each other.

Variation 8 may include a product as set forth in any of Variations 5-8 further comprising a third set of magnets and a fourth set of magnets, wherein the third set of magnets are fitted into the first set of magnet holders and the second set of magnets are inserted into the second set of magnet holders.

Variation 9 may include a product as set forth in any of Variations 5-9 wherein the first set of magnet holders are transition fit into the third set of cutouts and wherein the second set of magnet holders are transition fit into the fourth set of cutouts.

Variation 10 may include a product as set forth in any of Variations 5-9 wherein the third set of magnets are transition fit into the first set of magnet holders and the fourth set of magnets are transition fit into the second set of magnet holders.

Variation 11 may include a product as set forth in any of Variations 5-10 further comprising: a rotor core, wherein a plurality of rotor laminations form the rotor core; a stator, wherein the rotor core rotates around the stator; and wherein when the rotor core rotates around the stator the first and second magnet creates a centrifugal load onto at least one of the rotor laminations, and wherein the first magnet holder and the second magnet holder are constructed and arranged to carry the centrifugal load away from the at least one rotor lamination.

Variation 12 may include a product comprising: a rotor lamination comprising: an annular portion which includes an annular opening in its center, wherein a plurality of first, second, third, and fourth cutouts extend around the periphery of the annular portion; a first set of magnets, wherein the first set of magnets are inserted into the plurality of first and second cutouts; a first set of magnet holders and a second set of magnet holders, wherein the first set of magnet holders are inserted into the plurality of third cutouts and wherein the second set of magnet holders are inserted into the plurality of fourth cutouts; and a second set of magnets, wherein the second set of magnets are inserted into the first and second set of magnet holders.

Variation 13 may include a product as set forth in Variation 12 wherein the first set of magnet holders are transition fit into the plurality of third cutouts and wherein the second set of magnet holders are transition fit into the plurality of fourth cutouts.

Variation 14 may include a product as set forth in any of Variations 12-13 wherein the second set of magnets are transition fit into the first and second sets of magnet holders.

Variation 15 may include a product as set forth in any of Variations 12-14 wherein the first and second set of magnet holders are constructed and arranged to carry a load from the second set of magnets away from a bridge section and a plurality of web sections on the rotor lamination.

Variation 16 may include a product as set forth in any of Variations 12-15 wherein the first and the second set of magnet holders include at least one load carrying member which may be constructed and arranged to carry a perpendicular load from the second set of magnets.

Variation 17 may include a product comprising a rotor core comprising: a plurality of rotor laminations each comprising an annular portion which includes an annular opening in its center, wherein a plurality of first, second, third, and fourth cutouts extend around the periphery of the annular portion; a first set of magnets, wherein the first set of magnets are inserted into at least a portion of the plurality of first and second cutouts; a first set of magnet holders and a second set of magnet holders, wherein the first set of magnet holders are inserted into at least a portion of the plurality of third cutouts and wherein the second set of magnet holders are inserted into at least a portion of the plurality of fourth cutouts; and a second set of magnets, wherein the second set of magnets are inserted into the first and second set of magnet holders.

Variation 18 may include a product as set forth in Variation 17 wherein the first and second set of magnet holders are constructed and arranged to reduce a load from a centrifugal force of the second set of magnets.

Variation 19 may include a product as set forth in any of Variations 17-18 wherein the first and second magnet holders comprise a first portion, a second portion, and a third portion, wherein the first and second portions are linear and wherein the third portion extends outward from approximately a center location between the first and the second portions, and wherein the third portion is constructed and arranged to carry a load from a centrifugal force of a magnet.

The above description of select variations within the scope of the invention is merely illustrative in nature and, thus, variations or variants thereof are not to be regarded as a departure from the spirit and scope of the invention.

What is claimed is:
1. A product comprising:
 a magnet holder for a rotor lamination comprising a plurality of cutouts and wherein the magnet holder is a separate component from the rotor lamination and is constructed and arranged to be transition fit within at least one of the cutouts, and further comprising:
 a first wall, a second wall opposite of the first wall, a third wall, a fourth wall opposite of the third wall, and wherein the first wall, the second wall, the third wall, and the fourth wall form a rectangular shape, and wherein an inner surface of the first wall, the second wall, the third wall, and the fourth wall define a cavity constructed and arranged to accommodate a magnet, wherein the arm extends outward from the fourth wall at a central location between the first wall and the second wall.

2. The product of claim 1 wherein a side of the arm forms an acute angle with the fourth wall.

3. The product of claim 1 wherein the magnet holder comprises steel.

4. The product of claim 1 wherein the magnet holder comprises a polymeric material.

5. A product comprising:
 a magnet holder for a rotor lamination comprising:
 a first portion, a second portion, and a third portion, wherein the first and second portions are linear and constructed and arranged to hold a magnet and wherein the third portion extends outward from a center location between the first and the second portions;
 a rotor lamination comprising a plurality of cutouts and wherein the magnet holder is inserted into at least one of the cutouts; and
 wherein the plurality of cutouts includes a first set of cutouts, a second set of cutouts, a third set of cutouts, and a fourth set of cutouts, and wherein a first set of magnets are inserted into the first set of cutouts and a second set of magnets are inserted into the second set of cutouts, and wherein a first set of magnet holders are inserted into the third set of cutouts, and a second set of magnet holders are inserted into the fourth set of cutouts.

6. The product of claim 5 wherein the first set of cutouts and the second set of cutouts are the mirror image of each other and wherein the third set of cutouts and the fourth set of cutouts are the mirror image of each other.

7. The product of claim 5 further comprising a third set of magnets and a fourth set of magnets, wherein the third set of magnets are fitted into the first set of magnet holders and the second set of magnets are inserted into the second set of magnet holders.

8. The product of claim 7 further comprising:
a rotor core, wherein a plurality of rotor laminations form the rotor core;
a stator, wherein the rotor core rotates around the stator; and
wherein when the rotor core rotates around the stator the first and second magnet creates a centrifugal load onto at least one of the rotor laminations, and wherein the first magnet holder and the second magnet holder are constructed and arranged to carry the centrifugal load away from the at least one rotor lamination.

9. The product of claim 5 wherein the first set of magnet holders are transition fit into the third set of cutouts and wherein the second set of magnet holders are transition fit into the fourth set of cutouts.

10. The product of claim 9 wherein the third set of magnets are transition fit into the first set of magnet holders and the fourth set of magnets are transition fit into the second set of magnet holders.

11. A product comprising:
a rotor lamination comprising:
an annular portion which includes an annular opening in its center, wherein a plurality of first, second, third, and fourth cutouts extend around the periphery of the annular portion;
a first set of magnets, wherein the first set of magnets are inserted into the plurality of first and second cutouts;
a first set of magnet holders and a second set of magnet holders, wherein the first set of magnet holders are inserted into the plurality of third cutouts and wherein the second set of magnet holders are inserted into the plurality of fourth cutouts; and
a second set of magnets, wherein the second set of magnets are inserted into the first and second set of magnet holders.

12. The product of claim 11 wherein the first set of magnet holders are transition fit into the plurality of third cutouts and wherein the second set of magnet holders are transition fit into the plurality of fourth cutouts.

13. The product of claim 11 wherein the second set of magnets are transition fit into the first and second sets of magnet holders.

14. The product of claim 11 wherein the first and second set of magnet holders are constructed and arranged to carry a load from the second set of magnets away from a bridge section and a plurality of web sections on the rotor lamination.

15. The product of claim 14 wherein the first and the second set of magnet holders include at least one load carrying member which may be constructed and arranged to carry a perpendicular load from the second set of magnets.

16. A product comprising a rotor core comprising:
a plurality of rotor laminations each comprising an annular portion which includes an annular opening in its center, wherein a plurality of first, second, third, and fourth cutouts extend around the periphery of the annular portion;
a first set of magnets, wherein the first set of magnets are inserted into at least a portion of the plurality of first and second cutouts;
a first set of magnet holders and a second set of magnet holders, wherein the first set of magnet holders are inserted into at least a portion of the plurality of third cutouts and wherein the second set of magnet holders are inserted into at least a portion of the plurality of fourth cutouts; and
a second set of magnets, wherein the second set of magnets are inserted into the first and second set of magnet holders.

17. The product of claim 16 wherein the first and second set of magnet holders are constructed and arranged to reduce a load from a centrifugal force of the second set of magnets.

18. The product of claim 17 wherein the first and second magnet holders comprise a first portion, a second portion, and a third portion, wherein the first and second portions are linear and wherein the third portion extends outward from approximately a center location between the first and the second portions, and wherein the third portion is constructed and arranged to carry a load from a centrifugal force of a magnet.

* * * * *